United States Patent [19]
Saari

[11] 4,048,867
[45] Sept. 20, 1977

[54] MECHANICAL DEVICE CONVERTING ROTARY INPUT TO LINEAR COMPRESSION OR STRETCHING OUTPUT WITH A HIGH MECHANICAL ADVANTAGE

[75] Inventor: Oliver Edward Saari, Minneapolis, Minn.

[73] Assignee: Illinois Tool Works Inc., Chicago, Ill.

[21] Appl. No.: 691,671

[22] Filed: June 1, 1976

[51] Int. Cl.² .................................... F16H 1/18
[52] U.S. Cl. .................................... 74/424.8 B
[58] Field of Search ............... 74/459, 424.8 B, 89.15

[56] References Cited

U.S. PATENT DOCUMENTS

| | | | |
|---|---|---|---|
| 1,045,745 | 11/1912 | Raes | 74/424.8 B |
| 2,338,271 | 1/1944 | Ulanet | 74/424.8 B |
| 2,520,702 | 8/1950 | Verderber | 74/424.8 B |
| 3,295,385 | 1/1967 | Jenny | 74/424.8 B |
| 3,614,900 | 10/1971 | Wahlmark | 74/459 |
| 3,726,151 | 4/1973 | Lemor | 74/424.8 B |

Primary Examiner—Samuel Scott
Assistant Examiner—Wesley S. Ratliff, Jr.
Attorney, Agent, or Firm—Edward L. Benno; Robert W. Beart

[57] ABSTRACT

A mechanical device converting rotary input to linear compression or stretching output with a high mechanical advantage and with a minimum of frictional losses which comprises a screw member having multiple lead threads and a pair of jaw assemblies carried on the screw member. Each of the jaw assemblies comprises a plurality of roller members equal in number to the thread-starts on the screw member and an outer member having internal annular grooves in rolling contact with the roller members. The roller members of one of the jaw assemblies have a larger pitch-diameter than the pitch-diameter of the rollers members of the other jaw assembly.

6 Claims, 3 Drawing Figures

MECHANICAL DEVICE CONVERTING ROTARY INPUT TO LINEAR COMPRESSION OR STRETCHING OUTPUT WITH A HIGH MECHANICAL ADVANTAGE

BACKGROUND OF THE INVENTION

Prior art devices which might be compared to devices of the present invention are relatively unknown. One known device which may be noted, but which is not a good comparison is a jack-screw having a pair of jaw nut members threaded thereon, one of which has internal left hand threads and the other which has internal right hand threads. Rotation of the screw in such known jack-screws will cause the jaw members to axially translate toward and away from each other in a clamping or spreading action. However, as is well-known, such devices have high frictional losses particularly when attempts are made to produce high clamping or spreading forces.

SUMMARY OF THE INVENTION

Devices made according to the present invention have substantially no frictional losses because such devices operate with substantially pure rolling action. Further, devices of the subject invention can be made to produce almost infinitely large compression or spreading forces. Of course, as such devices are made with a higher and higher mechanical advantage, the relative linear movement between the jaw assemblies becomes lower and lower relative to the common linear movements of the jaw assemblies along the screw member. Practical constructions of devices of the subject invention involve design considerations of the desired mechanical advantage and the desired linear distance in which to produce the desired compression or spreading forces. It is contemplated that devices of the present invention will find greatest use in situations where a relatively high mechanical advantage is desired over a relatively small increment of linear movement during which some object is compressed, stretched or otherwise acted upon by the relative linear movement of the jaw assemblies.

Briefly, devices of the present invention comprise a screw member having multiple-lead threads. The screw member is the rotary input member and it is contemplated that in many uses of the invention a simple hand crank or relatively small motor may be used to rotate the screw member. A pair of jaw assemblies are mounted on the screw member in an axially spaced-apart relationship. Each of the jaw assemblies comprises an outer member having a bore therethrough with a plurality of annular grooves extending substantially the length of the bore. A number of roller members are in rolling contact with the annular grooves in the bore, and those rolling members are further in rolling contact with the threads of the screw member. The number of roller members in each jaw assembly is equal to the number of thread starts on the screw member. Each of the roller members is formed with a plurality of annular teeth substantially equal in number to the number of grooves in the outer member in which it is assembled. The annular teeth on the roller members are of substantially equal pitch and matching configuration to the pitch and shape of the teeth of the screw member. The annular grooves of the outer member are of substantially equal pitch and complementary shape to the annular teeth of the roller members. The roller members in each jaw assembly are substantially uniformly spaced-apart circumferentially about the screw member.

The pitch diameters of the roller members and the annular grooves of the outer member of one of the jaw assemblies is greater than the corresponding pitch diameters of the other jaw assembly. In that arrangement each jaw assembly will be translated linearly of the screw member if the outer members of the jaw assemblies are constrained against rotation while the screw member is rotated. In that described operation of the device, the roller members of each jaw assembly will orbit and will equalize in their orbits under load.

By appropriately solving the equation set out in the hereinafter following detailed description, for each of the jaw assemblies it will be found that each of the jaw assemblies will have an effective lead different from the other and different from the lead of the screw member. The different effective leads of the two jaw assemblies will cause a relative movement between the jaw assemblies, either toward or away from each other depending upon the direction of rotation of the screw member as both of the jaw assemblies are axially translated in the same direction.

The further equation in the detailed description for the mechanical advantage produced in the described operation of a device made according to the invention will show the extremely high mechanical advantages that can be produced.

An important feature of devices made according to the invention is that because the conversion of rotary motion to linear motion is accomplished through substantially pure rolling contact between the parts of the device, frictional losses in operation of the device are minimal.

A further feature involves the line contact between the teeth of the roller members and the annular grooves of the outer members and the teeth of the screw member. Because the total number of line contacts between the teeth of each roller member and the annular grooves of an outer member are equal to the total number of line contacts between the teeth of each roller member and the teeth of the screw member, the total action and reaction forces on each roller member in use of the device are substantially equal and opposite. Thus, each assembly of a jaw assembly and the screw member is inherently strong.

A further feature of the invention is that devices made according to the invention can easily be increased in strength by increasing the length of the roller members and the number of teeth thereon with a corresponding increase in length of the bores of the outer members of the jaw assemblies with a corresponding increase in the number of annular grooves in those bores. Devices made according to the invention may further be increased in strength by increasing the number of thread starts on the screw member with a corresponding increase in the number of roller members in each of the jaw assemblies.

The primary object of the present invention is to provide a mechanical device using a rotary motion input with a linear output to produce compression or stretching forces between the output members with a high mechanical advantage and with a minimum of frictional losses and in which the device is inherently capable of transmitting substantial power therethrough and of absorbing relatively high loads in operation.

Other objects and features of the invention will be apparent upon a perusal of the hereinafter following detailed description read in conjunction with the drawings.

IN THE DRAWINGS

DETAILED DESCRIPTION OF A PREFERRED EMBODIMENT

Figure 1:
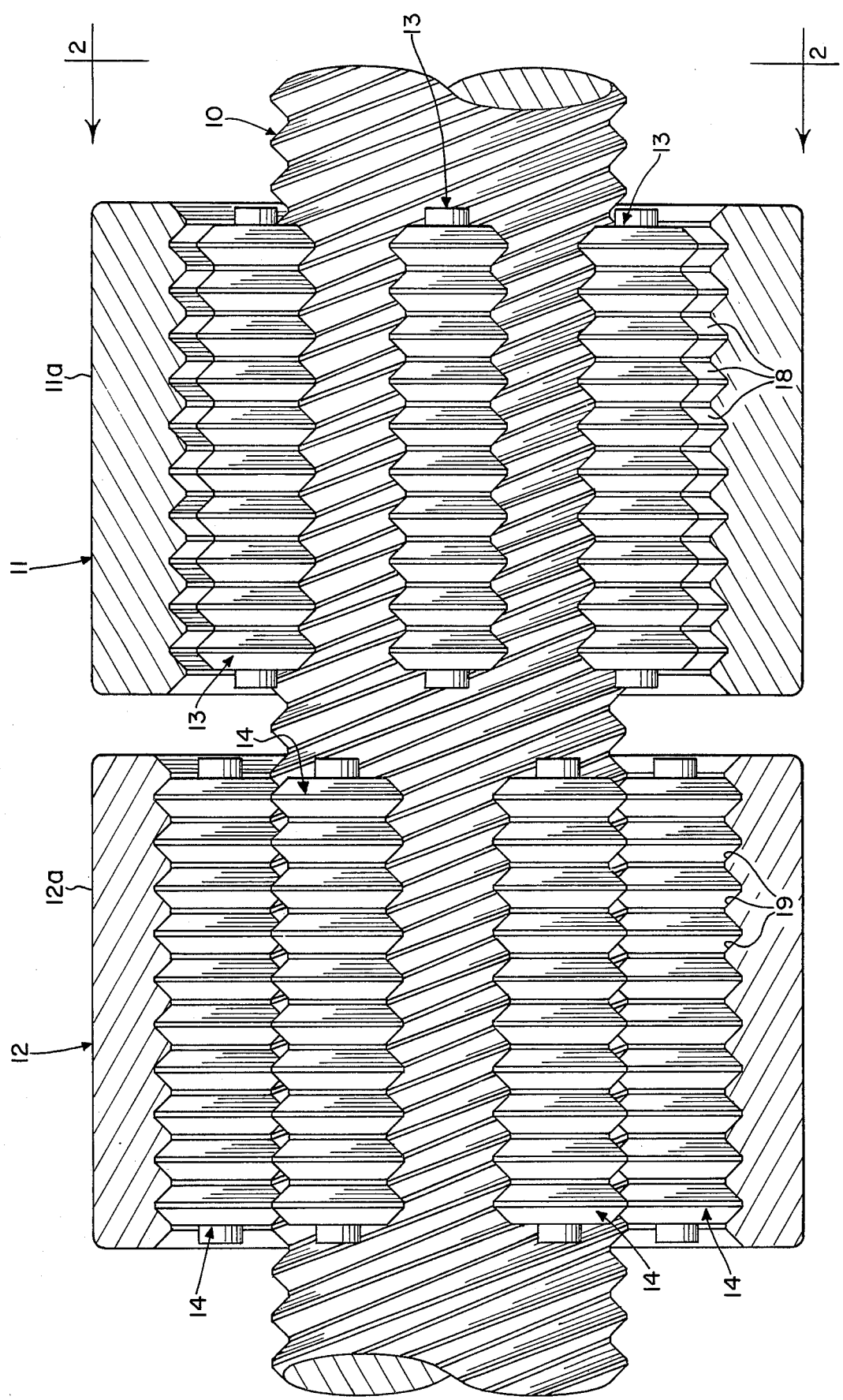
FIG. 1 is a side elevational view partially in cross section of one embodiment of a device constructed according to the invention.

Some of the basic elements of the subject invention are further shown and described in my co-pending United States patent application Ser. No. 682,559, filed May 3, 1976, and reference is made to that application for further details of some of the additional constructions that may be used in or with devices of the present invention.

In a preferred embodiment of the invention, a mechanical device converting rotary input to linear compression or stretching output with a high mechanical advantage and with a minimum of frictional losses is provided in a simple assembly of a certain screw member and two particular jaw assemblies.

The screw member may be of a conventional thread form with multiple thread starts. In preferred forms of the subject invention, a screw with six or more thread starts is used. Further, in the preferred forms a screw is used which has a profile of a 90° included angle between the sides of each tooth on the thread profile.

Each jaw assembly comprises an outer member including a jaw portion and a set of roller members. The outer member is provided with a bore therethrough and a plurality of annular grooves are formed in the bore substantially the full length of the bore. The annular grooves are complementary in shape to the teeth of the screw member and have substantially the same axial pitch as that of the threads of the screw member.

The set of roller members of each jaw assembly are equal in number to the number of thread starts on the screw member. Each of the roller members has a plurality of annular teeth which are of substantially equal pitch and complementary shape to the annular grooves in the bore of the outer members.

The screw member and the pair of jaw assemblies are relatively sized so that each set of roller members may be assembled within its outer member with the annular teeth of the roller members in rolling contact with the annular grooves of the outer member and with the screw member threaded between the roller members of both sets of roller members with the helical threads of the screw member in rolling contact with the annular teeth of the roller members, such as shown in the drawings. The number of annular grooves in each bore is substantially equal to the number of annular teeth on each of the roller members mounted therein.

Further importantly, the pitch diameters of the roller members and the annular grooves of the outer member of one of the jaw assemblies are greater than the corresponding pitch diameters of those parts of the other jaw assembly.

Referring to the drawing, as shown therein a screw member 10 having six thread starts is provided. Further, the threads of the screw member have a profile in an axial plane of an included angle of substantially 90°. The screw member 10 must further have a length sufficient for the desired range of operation of the device and, of course, some known means for applying a rotational force to the screw member 10 such as crank 10a shown on the screw 10 in the example device shown in FIG. 3.

Figure 2:
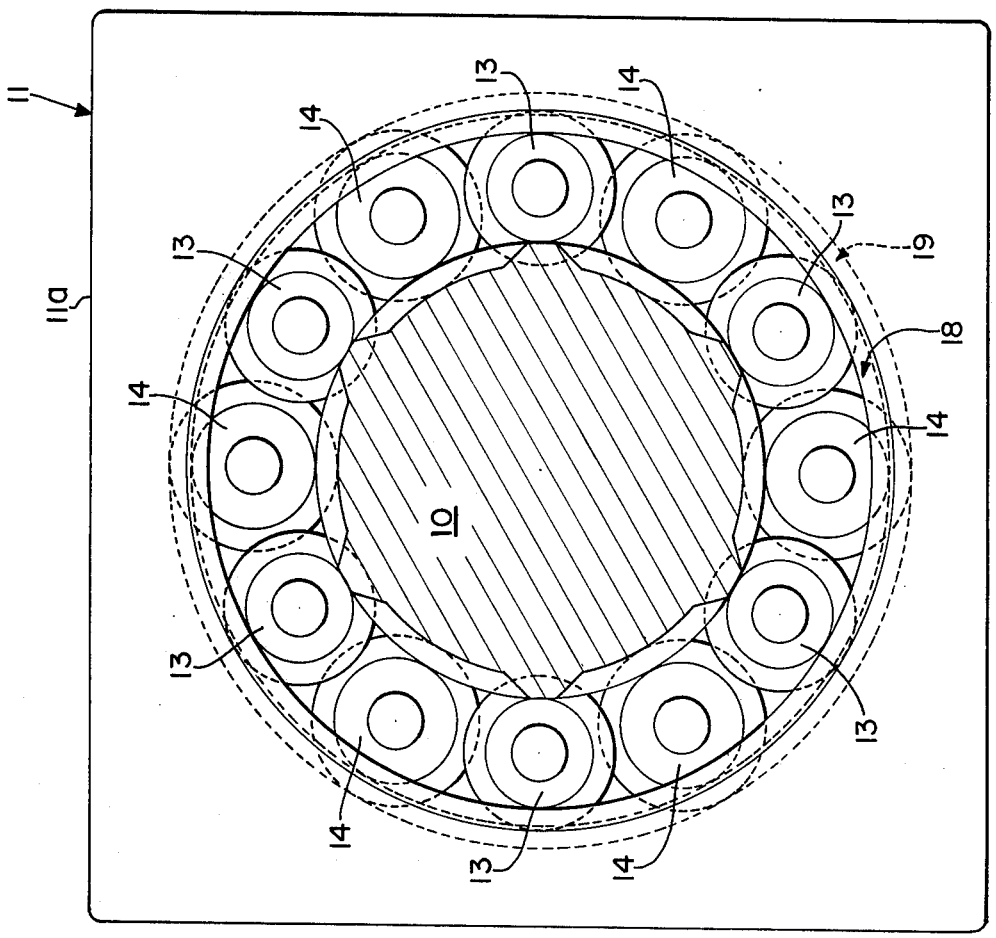
FIG. 2 is an end elevational view of the structure shown in FIG. 1 and viewed substantially along the line 2 — 2 of FIG. 1.

Two jaw assemblies 11 and 12 are further provided. The jaw assemblies 11 and 12 are substantially identical in form, but different in size as noted above. The jaw assembly 11 comprises an outer member 11a, and the jaw assembly 12 comprises an outer member 12a. Jaw assembly 11 is further provided with six roller members 13, and jaw assembly 12 is provided with the six roller members 14 as may be seen in FIGS. 1 and 2.

Figure 3:
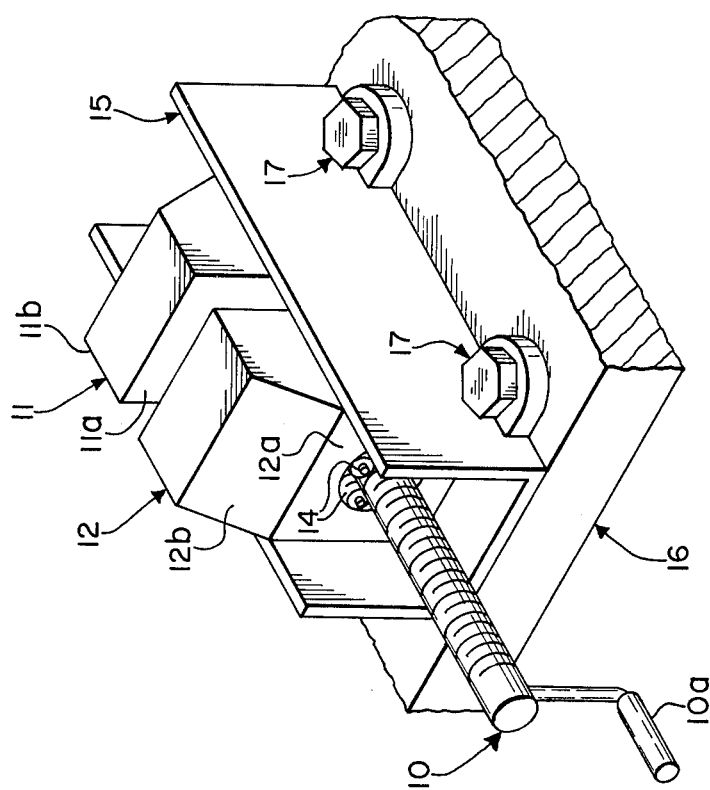
FIG. 3 is an isometric view of a simple compression device made according to one embodiment of the invention.

Neither outer member 11a nor 12a is shown with a jaw portion, which jaw portions would be used to apply compressive or stretching forces to some object. Those skilled in this art will understand that many different types and forms of jaw portions may be mounted or integrally formed on the outer members 11a and 12a dependent upon the particular use to which the device is to be put. FIG. 3 shows one such simple construction in which jaw portions 12b and 11b have been integrally formed on the respective outer members 12a and 11a. Further, while the outer surface of the outer members 11a and 12a are shown substantially as four flat surfaces defining a square in transverse cross section, those skilled in the art will understand that the outer surfaces of the outer members 11a and 12a may have any suitable shape which can be conveniently used to prevent rotation but permit axial translation of the jaw assembly 11 and 12, such for example as gibs and ways well-known in the machine tool art. One simple arrangement is again shown in FIG. 3 wherein a U-shaped trough 15 is shown fastened to a work table 16 by fasteners 17. The interior sidewalls and bottom wall of the trough 15 substantially correspond to the sidewall and bottom wall dimensions of the two jaw assemblies 11 and 12 so that they are prevented from rotation about their axes, but permitted to axially slide in the trough. It should be further understood that the invention contemplates that the outer members 11a and 12a need not be formed as an integral one-piece member, but may be formed of two or more pieces so arranged that the members can be quickly radially applied into surrounding relation to or removed from a screw member.

Each of the outer members 11a and 12a is formed with a bore extending therethrough. The bore through the outer member 11a is provided with a plurality of annular grooves 18, while the bore of the outer member 12a is provided with a plurality of annular grooves 19. The annular grooves 18 and 19 extend substantially the full length of their respective bores and the grooves are shaped substantially complementary to the teeth of the screw member 10 and with substantially the same axial pitch as the teeth of the screw member 10. The pitch diameter of the annular grooves 19 is larger than the pitch diameter of the annular grooves 18.

Each of the roller members 13 and 14 is formed with a plurality of annular teeth thereon substantially equal in number to the respective number of annular grooves 18 and 19. The annular teeth of each of the roller members 13 and 14 have substantially the same axial pitch as the teeth of the screw member 10 and a substantially matching configuration to the shape of the teeth of the screw member 10. The pitch diameters of the annular teeth of the roller members 14 are larger than the pitch diameters of the annular teeth of the roller members 13.

In the assembly of the device, the roller members 13 and 14 are respectively mounted within the outer members 11a and 12a with the annular teeth of the roller members in rolling contact with the annular grooves of the outer members. The roller members in each outer member 11b and 12a are further uniformly spaced-apart circumferentially within the outer members and the screw member 10 is then threaded through the jaw assemblies 11 and 12 so that the annular teeth of the roller members are in rolling contact with the threads of the screw member 10.

In the embodiment shown in the drawings, each of the roller members 13 and 14 is provided with small stub shafts at each end thereof. Those stub shafts may conveniently be used in cooperation with locating collars to properly hold and align the roller members prior to insertion of the screw member 10. Further, if desired, such locating collars in various forms may be left within the jaw assemblies for reasons and uses such as noted in my above-mentioned co-pending United States patent application. Further, as mentioned in that co-pending patent application, dirt seals may be provided at each end of each jaw assembly 11 and 12, if desired.

When the device is assembled as described, the screw member 10 may be rotated and, if the jaw assemblies 11 and 12 are prevented from rotation but allowed to axially translate, each of the jaw assemblies 11 and 12 will translate axially of the screw member 10 in one direction or the other depending upon the direction of rotation of the screw member 10. In operation of the device the roller members will orbit and the roller members will transmit forces with almost pure rolling action between the threads of the screw member 10 and the annular grooves 18 and 19 of the jaw assemblies 11 and 12. In each jaw assembly 11 and 12 there is substantially the same amount of rolling contact resisting both the action and reaction forces, and those forces are equal and substantially colinear with the result that each jaw assembly 11 and 12 will translate axially of the screw member 12 with low friction and in a stable and strong rotary to linear motion converting arrangement.

Because the roller members 13 and 14 orbit and roll in a planetary motion, the effective lead of each jaw assembly 11 and 12 is the ratio of linear output to angular input and that ratio is less than the lead of the screw member 10. The following formula may be used to calculate the effective lead for each of the jaw assemblies 11 and 12:

$$L' = L(D/D + S)$$

Where:
$L'$ = the effective lead of the jaw assembly,
$L$ = the actual lead of the screw member,
$D$ = the rolling pitch diameter of the annular grooves of the outer member or the mean diameter of teeth engagement between the roller members and the annular grooves of the outer member, and
$S$ = the pitch diameter of the screw member or the mean diameter of tooth and thread engagement between the roller members and the screw member.

It is believed that one example of a device made according to the invention will aid in an understanding of the invention. In such an example, the following specific values may be given:

$S$ = 0.875 inches, which is the pitch diameter of the screw member 10,
$L$ = 0.738 inches, which is the actual lead of the screw member 10,
$D_3$ = 1.7500 inches, which is the rolling pitch diameter of the annular grooves 19 of the outer member 12a, and
$D_2$ = 1.6875 inches, which is the rolling pitch diameter of the annular grooves 18 of the outer member 11a.

Then:

$$L_3 = L(D_3/D_3 + S)$$

$$L_2 = L(D_2/D_2 + S)$$

Then:
$L_3$ = effective lead of jaw assembly 12,
$L_2$ = effective lead of jaw assembly 11,
Then substituting values:

$$L_3 = 0.738 (1.7500/1.7500 + 0.875) = 0.4920 \text{ inches}$$

$$L_2 = 0.738 (1.6875/1.6875 + 0.875) = 0.4860 \text{ inches}$$

From the above it may be seen that the annular grooves 19 of jaw assembly 12 have a rolling pitch diameter which is 0.0625 inches greater than the rolling pitch diameter of the annular grooves 18 of the jaw assembly 11. As a result of that difference in size, and of course the consequently larger diameter of the annular threads of the rolling members 14, jaw assembly 12 has an effective lead larger than that of jaw assembly 11 by 0.0060 inches. Thus, it may be seen that as the screw 10 is rotated while jaw assemblies 11 and 12 are constrained against rotation, both jaw assemblies 11 and 12 will axially translate in the same direction the distances found for the solutions of $L_3$ and $L_2$ for each rotation of the screw member 10. Further, because of the noted difference in effective lead, relative to each other the jaw assemblies 11 and 12 with either move together or apart a distance of 0.0060 inches dependent upon the direction of rotation of the screw member 10 for each rotation of the screw member 10.

Continuing further with a specific example, the force-distance equation for the device may be written as follows:

$$F_i \cdot 2pi \cdot r = F_o \cdot L_1$$

Where:
$F_i$ = force applied to the screw member 10 at the end of a lever arm in a direction perpendicular to the axis of screw member 10 and perpendicular to the lever arm,
$r$ = length of the lever arm on the screw member 10,
$F_o$ = compressive or stretching force produced between the jaw assemblies 11 and 12, and
$L_1 = L_3 - L_2$, where $L_3$ and $L_2$ are the effective leads found above.

Then given the following specific values:
$F_i$ = 10 lbs.
$r$ = 12 inches
$L_1$ = 0.0060 inches and substituting values:

$$F_o = (10 \cdot 6.28318 \cdot 12/0.0060)$$

$$F_o = 125,664 \text{ lbs. or } 62.83 \text{ tons}$$

From the foregoing, it may be seen that the mechanical advantage in the specific example given is 12,566.4 to 1. Thus, the extremely large mechanical advantages that can be produced with devices made according to the present invention is apparent. It should be kept in mind when considering the relationship of forces-in to forces-out occurring in the use of such a device, that for most practical purposes frictional losses can be ignored because of the inherently low frictional losses occurring in devices made according to the invention due to the almost pure rolling action between the various parts of the device. Further, when considering the mechanical advantages which are producible in such devices, it should be noted that the tooth construction having a profile of a 90° included angle inherently renders the device capable of transmitting relatively high forces without shearing the teeth. Further additionally, it should be kept in mind that the jaw assemblies may be made axially longer with more annular teeth on each roller and more annular grooves in each outer member to effectively transmit contemplated larger forces. Additionally, it should be kept in mind that devices made according to the invention may further be easily strengthened by providing a screw member 10 with more than the number of thread starts shown and described with a corresponding increase in the number of roller members.

Those skilled in the art will understand that devices made according to the invention with a relatively high mechanical advantage will most practically be used to apply relatively large compressive or stretching forces over relatively small distances. Considering in the above given example that for one turn of the screw member 10, the jaw assemblies 11 and 12 close a distance of 0.0060 inches, it should be noted that the effective lead of the slower translating jaw assembly 11 produces an axial travel of that jaw assembly along the screw member 10 of 0.4860 inches per turn of the screw member 10. Thus, the ratio of distance of travel of the jaw assemblies to closing increment is approximately 81 to 1. Thus, in the design and use of devices made according to the invention, the desired increment or opening or closing of the jaw assemblies 11 and 12 must take into account the length of the screw member needed for the desired mechanical advantage.

The simple device of FIG. 3 is intended to show one way in which a device according to the invention may be used. For an object of any particular size to be compressed between the jaws 11 and 12, the jaw assemblies 11 and 12 with the screw member 10 may be removed as a unit from the trough 15, and either jaw 11 or 12 may be then rotated on the screw member 10 until the spacing between the two jaw assemblies is close to the initial dimension of the article to be compressed. The jaw assemblies 11 and 12 with the screw member 10 may then be replaced in the trough 15 as shown, the object to be compressed then being placed between the jaw assemblies 11 and 12, and the screw member 10 may then be rotated to substantially immediately begin to apply compressing forces on the object.

Having described the invention, it is to be understood that changes can be made in the described embodiments by one skilled in the art within the spirit and scope of the hereinafter following claims.

I claimed:

1. In a rotary to linear device, a screw member and a pair of jaw assemblies, said screw member having multiple-lead threads, each of said jaw assemblies comprising an outer member and a independent plurality of roller members equal in number to the number of thread starts on said screw member, each of said roller members having a plurality of annular teeth of substantially equal axial pitch and substantially matching configuration to the teeth of said screw member, each outer member of said jaw assemblies having a bore therethrough including a plurality of internal annular grooves of substantially equal pitch and complementary shape to the annular teeth of said roller members, the number of annular grooves in each of said outer members being substantially equal to the number of annular teeth on each of said roller members, the roller members of each of said jaw assemblies mounted in substantially equally spaced-apart positions orbit about the periphery of said screw member with said annular teeth thereof in rolling contact with the threads of said screw member and the grooves in said outer members, and the pitch diameters of the roller members and the annular grooves of the outer member of one of said jaw assemblies being greater than the corresponding pitch diameters of the other of said jaw assemblies.

2. In a rotary to linear device as defined in claim 1, wherein each of said outer members of said jaw assemblies includes a jaw portion capable of transmitting a force in a direction axially of said bore.

3. In a rotary to linear device as defined in claim 1, wherein the profile of the threads of said screw member comprises substantially a 90° included angle between the sides of each tooth on the thread profile.

4. In a rotary to linear device as defined in claim 1, wherein said screw member is formed to have at least six thread starts.

5. In a rotary to linear device as defined in claim 1, and means for constraining said jaw assemblies against rotation while permitting said jaw assemblies to translate axially of said screw member responsive to rotations of said screw member.

6. In a rotary to linear device as defined in claim 4, and means on said screw member for rotating said screw member.

* * * * *